United States Patent [19]

Dahlström et al.

[11] 4,331,963

[45] May 25, 1982

[54] RECORDING DEVICE

[75] Inventors: Bo Dahlström, Vällingby; Sven G. Olsson, Sollentuna, both of Sweden

[73] Assignee: Siemens Aktiengesellschaft, Berlin & Munich, Fed. Rep. of Germany

[21] Appl. No.: 199,120

[22] Filed: Oct. 21, 1980

[30] Foreign Application Priority Data

Oct. 22, 1979 [DE] Fed. Rep. of Germany ....... 2942614

[51] Int. Cl.³ .............................................. G01D 9/36
[52] U.S. Cl. ........................................ 346/62; 346/65
[58] Field of Search .................................. 346/62–65, 346/29, 34

[56] References Cited

U.S. PATENT DOCUMENTS

| 3,321,767 | 5/1967 | Fulchino | 346/34 |
| 3,500,433 | 3/1970 | Wasilewski et al. | 346/65 X |
| 3,605,111 | 9/1971 | Schmoll | 346/62 |
| 4,051,482 | 9/1977 | Andresen | 346/62 x |

Primary Examiner—L. T. Hix
Assistant Examiner—W. J. Brady
Attorney, Agent, or Firm—Hill, Van Santen, Steadman, Chiara & Simpson

[57] ABSTRACT

In an exemplary embodiment, a recording head and recording carrier are movable relative to one another for the purpose of recording several measurement signals on the recording carrier. It is the object of the disclosure to produce such a recording device which, with the lowest possible technical outlay, offers an optimum variation possiblity in the recording of a plurality of individual signals. This object is achieved in accordance with the disclosure by virtue of the fact that there is allocated, to an individual recording head as the recording element on the recording carrier, a variable number; e.g., between one and sixteen, of recording channels for measurement signals, into which recording channels the recording head can be driven by motor drive in chronological succession for the purpose of recording the signals in time-division multiplex operation, whereby the width of a respectively preselected channel or subchannel is prescribed by a width selector which determines the widths corresponding to a width program to be adjusted on the latter in advance, and to which a width/voltage converter is connected which, corresponding to the width of the channel generates a more or less rapidly rising ramp voltage ($U_R$), which, together with the signal values obtained in the time-division multiplex operation, is supplied to a comparator for the comparison and output of a recording signal to the recording head for the purpose of recording a signal point in the case of equality of the voltage values.

14 Claims, 3 Drawing Figures

RECORDING DEVICE

BACKGROUND OF THE INVENTION

The invention relates to a recording device comprising a recording element and a recording carrier which can be moved relative to one another for the purpose of recording measurement signals on the recording carrier, and whereby the recording element is designed for recording several signals on the recording carrier.

In recorders of this type, the desire exists for obtaining a maximum-possible effectiveness in the signal recording with as low as possible an overall outlay for electronic circuitry and mechanical component parts. In particular, with an optimally compact type of construction, as great as possible a number of recording possibilities for a correspondingly high number of signals is to be made available. In addition, simultaneously a randomly rapid variation possibility of the number of individual signals to be recorded in individual channels is to be provided.

SUMMARY OF THE INVENTION

It is the object of the present invention to construct a recorder of the type initially cited which altogether optimally satisfies the above requirements.

In accordance with the invention, the object is achieved by virtue of the fact that there is allocated, to an individual recording head as the recording element on the recording carrier, a variable number e.g. between one and sixteen, of recording channels for measurement signals into registry with which the recording head can be driven by means of a motor drive, in chronological succession, for the purpose of recording the signals in a time-division multiplex operation, whereby the width of a respectively preselected channel is prescribed by a width selector which establishes the widths corresponding to a width-program to be adjusted on the latter in advance, and with which there is connected, on the output side, a width/voltage converter which generates, corresponding to the width which is to be scanned for the currently active channel, a more or less rapidly increasing ramp voltage which, together with the signal values obtained in the time-division multiplex operation, is supplied to comparator means for comparison and for output of a recording signal to the recording head for the purpose of recording a signal point in the case of equality of the voltage values.

The invention renders possible an optimum variability in the signal recording with an optimally low mechanical and electronic outlay. With only one single recording head, the possibility exists of representing altogether up to e.g. sixteen signals or any desired components of these signals according to a program on a single recording support in recording channels which are respectively equal or randomly varying in width.

Additional advantages and details of the invention shall be apparent from the following description of an exemplary embodiment on the basis of the accompanying drawing sheets in conjunction with the subclaims; and other objects, features and advantages will be apparent from this detailed disclosure and from the appended claims.

DETAILED DESCRIPTION

Figure 1:
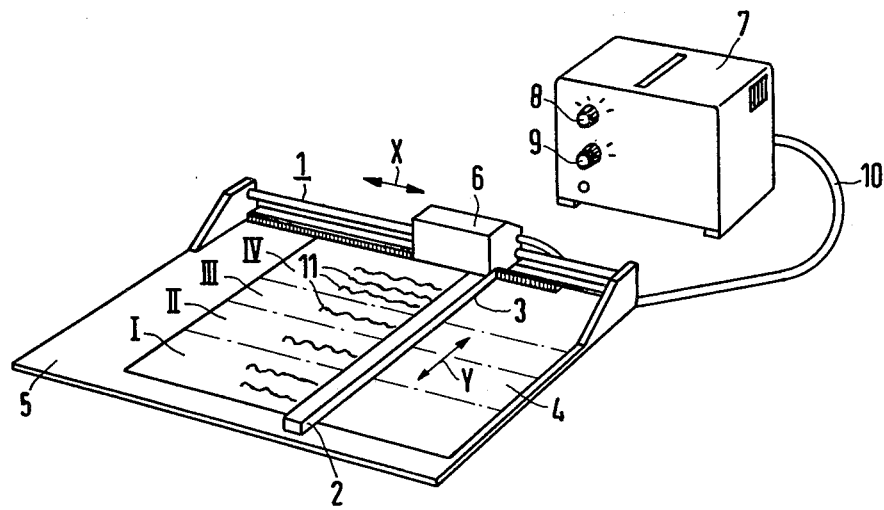
FIG. 1 illustrates the inventive recorder in a perspective view.

FIG. 1 illustrates the recorder 1 which comprises a slide rail 2 at the underside of which a recording head 3 is movably support-mounted for movement in a Y-direction along the length of the rail and in an X-direction together with the rail. The recording head 3, in the present instance, is designed so as to be heatable. The recording carrier is referenced with 4 and is disposed on a recording support 5 of the device. Thermosensitive paper serves as the material which, upon contact pressure of the heated recording head 3, leaves behind recording tracks for the respective signals. The design in the form of a thermosensitive recorder, however, is merely exemplary. Within the framework of the invention, of course, also other recorders, such as embossers, ink-jet recorders, droplet recorders, etc., can be utilized. Reference numeral 6 designates a motor drive for effecting displacement movement in the X- and Y-directions. A control device for controlling the recording movement via the motor drive 6, as well as for generating recording signals for the recording head 3, is indicated by 7. Desired control programs can be selected by means of switches 8 and 9. The energy supply for the motor drive and heating as well as signal supply proceed via a conductor cable 10. The recorder of FIG. 1 functions in time-division multiplex operation; the recording head 3 correspondingly records measurement signals 11 point-by-point in the time-division multiplex operation by means of stepwise transverse through-clock pulsing along the Y-axis, with a respectively following advancement by one clock pulse step in X-direction.

Figure 2:
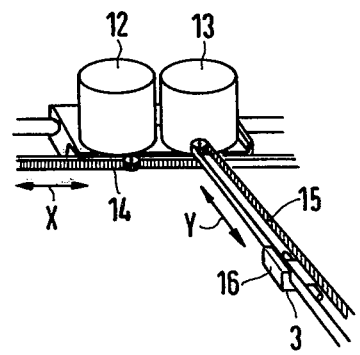
FIG. 2 illustrates a detail section of the recorder of FIG. 1 which illustrates in greater detail the motor drive for the individual recording head.

FIG. 2 shows that the motor drive 6 altogether comprises two motors 12 and 13 which are here designed in the form of stepping motors. The motor 12 operates a step-by-step movement in the X-direction via the belt drive 14, and the motor 13 effects a step-by-step movement in the Y-direction via the belt drive 15. The recording head 3 is disposed on the bottom side of the slide 16 which is displaceable in the Y-direction by means of the belt drive 15. The configuration of FIG. 2, insofar as the belt drive 15 is concerned, can be covered by the slide rail 2 of FIG. 1. Of course, as needed, an additional covering slide rail can be dispensed with. Other modification possibilities are likewise possible.

Figure 3:
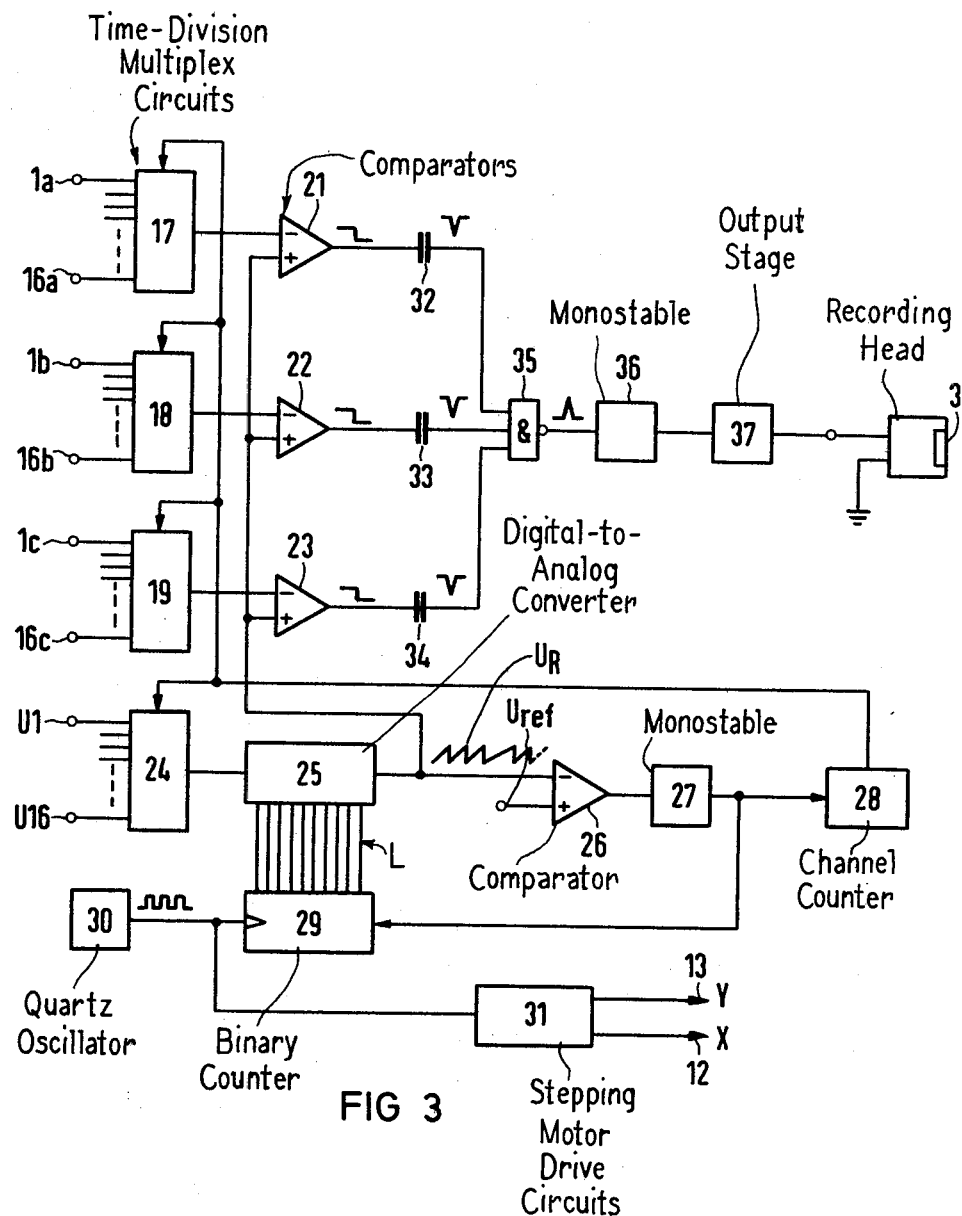
FIG. 3 illustrates the circuit arrangement for operation of the recorder, by means of a basic circuit diagram.

The specific circuit arrangement for the operation of the recording device of FIGS. 1 and 2 is illustrated by FIG. 3. This circuit diagram comprises, by way of example, three time-division multiplex-circuit arrangements 17, 18 and 19. Each of these arrangements possesses a total of sixteen inputs 1a through 16a, and 1b through 16b, and 1c through 16c, respectively, for a total of $3 \times 6 = 48$ individual signals. Accordingly, with the recording device, given full utilization, a total of forty-eight measurement signals can be recorded in time-division multiplex operation in mutually parallel separate channels or, as needed, also in overlapping or superimposed channels. By omitting individual signals at specific signal inputs, the number of signals to be recorded or displayed can be decreased in a random fashion. The signal data occurring in time-division multiplex form (only one signal being sampled at each sampling instant) at the outputs of the time-division multiplex circuit arrangements 17 through 19 are transmitted to the one input of comparators 21, 22 and 23. At the other input of the comparators a ramp voltage $U_R$ is connected which is generated by means of an additional time-division multiplex arrangement 24 with an output-connected digital-to-analog-converter 25. The time-division multiplex arrangement 24, in turn, exhibits sixteen voltage inputs to which d.c. voltages U1 through U16 are connected. The d.c. voltages U1 through U16 can be preselectable according to program; for example, they can be stepped in equal volt-steps, for example, one volt steps. The possibility of other step combinations exists as well. In dependence upon the selected amplitude steps of the voltages U1 through U16, there results, at the output of the digital-to-analog converter 25, a more or less rapidly increasing ramp voltage $U_R$. This ramp voltage $U_R$ is compared with a reference voltage $U_{ref}$ in an additional comparator 26. In the case of equality of the voltages, the comparator 26 generates an output signal which triggers a monostable flip-flop 27 momentarily to a set state. With the return of the monostable 27 to its stable (reset) state, a channel counter 28 is activated which is coupled at the output side with the time-division multiplex-arrangements 17, 18, 19 and 24, on the one hand; on the other hand, through the monostable 27, a binary counter 29 which counts the pulses of a quartz oscillator 30 is reset. The pulses of the quartz oscillator 30 are simultaneously step-pulses for the drive circuit 31 for the X-axis stepping motor 12 as well as for the Y-axis stepping motor 13. The binary counter 29 is coupled to the digital-to-analog-converter 25 via the signal lines L. The described overall arrangement 24 through 31 serves the purpose of establishing the number of recording channels for individual measurement signals on the recording carrier 4, or it serves the purpose of preselection of the width of individual recording channels in the case of a prescribed overall number, respectively. Depending upon the preselection of the voltage values U1 through U16 at the time-division multiplex-arrangement 24 serving as the width-selector, there results, as already indicated, a more or less rapid rise in the ramp voltage $U_R$ at the output of the digital-to-analog-converter 25. Corresponding to this more or less rapid rise, the comparison voltage $U_{ref}$ is also more or less rapidly attained at the comparator 26. This signifies that, in dependence upon the rise of the ramp voltage $U_R$, the monostable 27 is more rapidly, or possibly less rapidly, set, as a consequence of which, in turn, the binary counter 29 is reset more rapidly or less rapidly. Thus, if the time-division multiplex arrangement 24 serves as width selector, at which, by means of preselection of specific voltages U1 through U16, the desired width of individual recording channels, preselected in number, is specifiable, then the digital-to-analog-converter 25 can be designated as width/voltage converter which, in conjunction with its ramp output voltage $U_R$ and the above-described circuit elements 26 through 29, establishes the widths of individual channels to be preselected on the recording carrier 4. The number of measurement signals which are to be allocated to an individual recording channel is, by contrast, capable of being determined by means of preselection of individual signal voltages 1a through 16c on the time-division multiplex arrangements 17 through 19 in conjunction with the ramp voltage $U_R$ via the comparators 21 through 23. If, for example, the width of a recording channel is selected to be relatively large, the possibility then exists, through preselection of a larger number of signals, of representing all of these signals in this single wide strip. The possibility likewise exists of preselecting merely a single signal or only a few signals. Given the selected large width, the signal is then expanded in amplitude, so that a wider amplitude progression results as compared with other recording tracks. FIG. 1 illustrates by way of example a recording format in e.g. four channels I, II, III, IV, whereby two measurement signals are recorded in channel I; merely one measurement signal is recorded in channels II and III; and, finally, a total of three measuring signals are recorded in channel IV.

The recording of the individual signals according to a preselected number and division into recording channels proceeds in dependence upon the output signals of the comparators 21, 22 and 23, via differentiating capacitors 32, 33 and 34. The differentiated output pulses from these capacitors which are generated in the desired scan format of the measurement signals in time-division multiplex operation, set, via a summation circuit 35, an additional monostable flip-flop 36 which delivers output signals which are further transmitted to the recording head 3 via a power (or output) final stage 37 as recording pulses actuating the heating of the recording head. Thus, a point-by-point recording in the Y-direction results with every Y-axis output pulse corresponding to the clock pulse instant of one of the signal values—arriving in the time-division multiplex operation—of the individual, preselected measurement signals. The shift pulse in the X-direction establishes the chronological progression over the time axis extending in the X-direction.

Thus, with the described exemplary embodiment, a recording device is produced in which, with only one single recording head, the recording of a plurality of measurement signals in random combinations in a specifiable number of recording channels on a single recording carrier is possible.

SUPPLEMENTAL DISCUSSION

For the example given in FIG. 1 of four channels I, II, III, IV, settings are established specifying values for inputs $U_1$, $U_2$, $U_3$, $U_4$ of multiplex arrangement 24, corresponding to the desired channel widths. The head 3 may begin its Y-axis scanning movement at $X=0$, $Y=0$, and the successive clock pulses from oscillator 30 are supplied to stepping motor 13, FIG. 2, to effect corresponding equal increments of movement of the head 3 along the Y-axis (and across the width of channels I, II, III and IV in succession).

The clock pulses from oscillator 30 are also supplied to binary counter 29. If channel I is relatively wide, $U_1$ will be a relatively lower voltage, so that the ramp waveform $U_R$ for channel I will have a smaller voltage step for each successive count condition of counter 29.

Case A—One Signal Input of a Signal Multiplex Circuit Per Channel

Where each channel is to receive recording signals according to only one input signal, only one multiplex circuit, e.g. circuit 17, need be used. In this case (Case A) channel counter 28 may be a four stage binary counter with four binary outputs for representing binary count values of zero through fifteen. The channel counter may be placed in an initial active condition (e.g. in a counting condition corresponding to a count value of one) for activating the first channel as the recording head 3 begins its movement along the Y-axis from Y=0. The voltage increment $\Delta V_I$ produced by each count of binary counter 29, with an energizing voltage $U_1$ applied to converter 25, may result in the ramp waveform $U_R$ just exceeding the value $U_{ref}$ after $N_I$ counts of binary counter 29. In this Case A, comparator 26 will switch at a count of binary counter 29 of $N_I$, and channel counter 28 will be actuated to a new count value (e.g. two), activating the second input (2a) of multiplex circuit 17 and the second input ($U_2$) of the multiplex circuit 24, such that voltage increments $\Delta V_{II}$ are produced by components 25, 29, and $N_{II}$ counts are required to again trigger comparator 26. If $U_2$ is forty percent greater than $U_1$, $\Delta V_{II}$ will be forty percent greater than $\Delta V_I$; thus $N_I$ will be forty percent greater than $N_{II}$ (so that the respective products $N_I \cdot \Delta V_I$ and $N_{II} \cdot \Delta V_{II}$ are essentially both equal to $U_{ref}$). Accordingly, the width of channel I will be forty percent greater than the width of channel II.

The signals at the first and second inputs (1a and 2a) of multiplex circuit 17 may each have an amplitude range extending from zero volts up to a maximum value near $U_{ref}$, but the input signal plotted on the wider channel will be analyzed with higher resolution ($N_I$ counts representing $N_I$ available signal points in channel I versus only $N_{II}$ signal points available in channel II).

Case B—One Signal Multiplex Circuit Per Channel

Where more than one signal is to be plotted per channel, component 28 may be implemented such that the channel counter controls selection of a different multiplex circuit (of the circuits such as 17-19) for each channel. Thus at a first channel count value (e.g. one) in the channel counter, input $U_1$ of multiplex circuit 24 would be active and multiplex circuit 17 would be selected. At a second channel count value (e.g. two), the second input ($U_2$) of multiplex circuit 24 would control converter 25, and the second multiplex circuit 18 would be selected, and so on.

Any suitable means may be utilized for sequencing the selected one of the multiplex circuits such as 17-19. For example if a maximum of three signals per channel were to be recorded (as shown in FIG. 1), a divide-by-three circuit for signal multiplex control could be interposed in component 28 prior to a four-stage (binary) channel selection counter of this component. If the divide-by-three signal multiplex control circuit were implemented as a signal multiplex input address binary counter, the first count value (e.g. one) of such multiplex address binary counter could enable the first input of each multiplex circuit (i.e. input 1a of circuit 17, input 1b of circuit 18, and input 1c of circuit 19). The state of the four stage channel selection counter would then determine which of the respective first input signals would actually be sampled. Thus if the channel selection counter were in its first count condition (e.g. a count value of one), the first input (1a) of signal multiplex circuit 17 would be active at a first count value (e.g. one) of the multiplex input address binary counter, the second input (2a) would be active at a second multiplex count value (e.g. two), and the third input (3a) would be active at a third multiplex count value (e.g. three). The carry pulse from the divide-by-three signal multiplex input address counter would then shift the channel selection counter to a second count condition (e.g. two) for selecting multiplex circuit 18 and the second channel width control input ($U_2$), and so on.

In this case (Case B), the first $N_{I1}$ pulses from oscillator 30 would result in a triggering of comparator 26 to shift the divide-by-three signal multiplex input address counter from its first count value to its second count value, and the first input of channel multiplex circuit 24 might have a value equal to one-third of the prior discussed value for $U_1$. Thus the new input value $U_1$ would directly define a subchannel width, and the signal multiplex input address divide-by-three counter of component 28 would provide the result that the complete channel would be made up of the desired number (i.e. three) of the subchannels. The value $U_{ref}$ could be adjusted to a lower value where the input signals were to have a lesser maximum amplitude. A reduced $U_{ref}$ value would reduce the width of each subchannel for a given setting of the values ($U_1$-$U_{16}$) at the input to multiplex circuit 24.

With a four stage binary signal multiplex input address counter and a four stage binary channel selection counter in series, the inputs ($U_1$-$U_{16}$) of multiplex circuit 24 would select the widths of sixteen sets of subchannels. The width of each channel would then be sixteen times the respective selected subchannel width. Then each signal input (1a-16a) if multiplex circuit 17 would be recorded on a respective subchannel of a first channel (I) each signal input (1b-16b) of multiplex circuit 18 would be recorded on a respective subchannel of a second channel (II), and so on.

Case C—Multiple Signals Per Channel and Multiple Channels Per Signal Multiplex Unit Where the invention is implemented with three signal multiplex units 17-19, and one channel width multiplex unit 24 as specifically illustrated in FIG. 3, it is possible for example, to record three signals per channel for up to sixteen channels (using the forty-eight signal inputs 1a-16c). In this case C, a divide-by-three counter might precede a four stage binary channel selection counter in component 28 so that the four stage channel selection counter is actuated after the scanning of each three subchannels. Thus the first three signal inputs (1a, 2a, 3a) would be scanned as the head 3 traversed three subchannels of channel I. The width of each subchannel of channel I would be determined by the first input voltage $U_1$ of multiplex circuit 24. The next three signal inputs (4a, 5a, 6a) would be successively selected during scanning of three subchannels of channel II, and so on.

For Case C, the successive signal inputs 1a-16c may be sequentially activated by any suitable circuitry. For example a six stage binary signal multiplex input address counter could sequentially activate up to sixty-four signal inputs. By resetting the first two stages of the counter to an initial count of one (at the beginning of the scan of the first subchannel and after each count of three, the first two stages of the six-stage counter could serve as the divide-by-three counter, and the next four stages of the six-stage counter could also serve as the channel selection counter stages for controlling multiplex unit 24.

A Case A circuit arrangement could be obtained from such Case C circuitry, for example by switching the input terminal of component 28 to the input of the third stage of the six-stage counter of Case C, and using the last four stages of the six-stage counter of Case C to control both multiplex circuit 17 and multiplex circuit 24.

Case D—Plural Signals Superimposed On One Channel

In Case A type operation, if more than one signal multiplex unit is present, the channel width counter 28 may activate the first inputs (e.g. 1a, 1b, 1c) of all such units simultaneously during recording of a first channel I with a width according to width program input voltage $U_1$. Thus with three signal multiplex units 17, 18, 19, up to three signals may be compared simultaneously to the same cycle of ramp waveform $U_R$. If the three signals each have an amplitude range from the initial value of the ramp waveform (e.g. zero volts or minus $U_{ref}$) up to the value plus $U_{ref}$, then the three signals will be superimposed on a common channel. If the voltage amplitude ranges of the three simultaneous input signals are offset over the range of the ramp signal, then the three signals will be recorded in offset relation on the same channel.

With Case D operation, the channel width counter need only comprise a four stage binary counter for sequentially selecting the respective inputs of each of the multiplex units 17, 18, 19, 24. The binary count value of counter 28 could be coupled by means of four output lines leading from the respective stages of the four stage binary counter to the multiplex address circuit of each of the multiplex units which would all operate in unison.

It will be apparent that many modifications and variations may be effected without departing from the scope of the novel concepts and teachings of the present invention.

We claim as our invention:

1. A recording device comprising a recording element and recording carrier which can be displaced relative to one another for the purpose of recording measurement signals on the recording carrier, the recording element being designed for the purpose of recording vessel recording measurement signals on the recording carrier,
   wherein the improvement comprises
   a single recording head (3) serving as the recording element for effecting time multiplex recording of measurement signals on a series of recording channels (e.g. I-IV),
   a motor drive (6) for effecting relative displacement of the single recording head (3) and the recording carrier (4) such that the single recording head (3) repeatedly scans across the width of the series of recording channels (I-IV) in chronological succession,
   a channel width selector (24) for individually controlling the width of each of said series of recording channels (I-IV), said channel width selector (24) having a width program (U1-U16) selected prior to a recording operation for individually establishing the widths of the respective recording channels,
   a width-selection-to-voltage converter (25) connected with the output of said channel width selector (24) and responsive to the width program thereof (U1-U16) for cyclically generating a ramp waveform ($U_R$) of progressively changing voltage value during scanning of each of said recording channels by said single recording head (3) with the rate of change of the ramp waveform during scanning of each respective channel being a function of the width selected for such channel, and
   signal multiplex means comprising a comparator circuit (21-23) for comparing different ones of the recording measurement signals with respective cycles of said ramp waveform ($U_R$) and operable for supplying a recording signal to the recording head (3) for recording a signal point on the recording carrier in response to equality of the voltage values under comparison.

2. A recording device according to claim 1, characterized in that the channel width selector (24) comprises a time-division multiplex circuit arrangement which possesses a width program in the form of a number of voltage inputs corresponding to the maximum number of preselectable recording channels, which voltage inputs can be preprogrammed with voltage signals (U1 through U16) whereby, through selection of varying step combinations of the voltage signals (U1 through U16), a preselection of varying widths of individual recording channels is effected.

3. A recording device according to claim 2, characterized in that the width-selection-to-voltage converter (25) is a digital-to-analog-converter which generates a ramp voltage ($U_R$) which is variable in its slope, in dependence upon the selected step combinations of the voltage signals (U1 through U16).

4. A recording device according to claim 1, characterized in that, for the purpose of specifying variable numbers of measurement signals (1a through 16a, 1b through 16b, 1c through 16c), which are to be recorded on the recording carrier (4) by means of the single recording head (3), said signal multiplex means comprises a time-division signal multiplex circuit arrangement (17, 18, 19) having individual signal inputs for individual signals, whereby the total number of all signals which can be recorded is established by the total number of all such signal inputs, while subcombinations of such signal inputs occupied by measurement signals establish a selected lesser number of measurement signals to be recorded during a given recording operation.

5. A recording device according to claim 4, with the channel width selector (24) comprising a time-division multiplex circuit arrangement having a width program in the form of a number of voltage inputs (U1-U16) for representing the selected widths of respective recording channels, and a channel counter (28) coupled with the width-selection-to-voltage converter (25) and responsive to the cyclical generation of the ramp waveforms ($U_R$) to sequentially activate the signal inputs of the time-division signal multiplex circuit arrangement (17, 18, 19) and to sequentially activate the voltage inputs of said time-division multiplex circuit arrangement of said channel width selector (24).

6. A recording device according to claim 5, with an additional comparator circuit (26) having a first input coupled with said width-selection-to-voltage converter (25) and responsive to the ramp waveform ($U_R$) generated thereby, and having a second input for receiving a voltage reference value ($U_{ref}$), and a monostable (27) for coupling the output of said additional comparator circuit (26) with said channel counter (28).

7. A recording device according to claim 6, with said width-selection-to-voltage converter comprising a digital-to-analog converter (25) for generating the ramp waveforms ($U_R$) with slopes in accordance with the voltage inputs (U1-U16), said digital-to-analog converter having a binary counter (29) coupled therewith for supplying successive digital values thereto, and a pulse source (30) coupled with said binary counter (29)

and with the motor drive (6) for effecting counting of the binary counter (29) in step with the displacement of the recording head (3) relative to the recording carrier.

8. A recording device according to claim 1, with said signal multiplex means comprising a time-division signal multiplex arrangement (17, 18, 19) having individual signal inputs for individual signals and operable to supply samples of the individual signals to said comparator circuit (21-23) for comparison with the cycles of said ramp waveform ($U_R$), a pulse shaping circuit (36) connected to the output of the comparator circuit (21-23) for shaping the recording signals transmitted by the comparator circuit (21-23), and signal amplifier means (37) for coupling the output of said pulse shaping circuit (36) with said recording head (3).

9. A recording device according to claim 8, characterized in that the pulse shaping circuit is a monostable circuit (36), and the signal amplifier means (37) is an output amplifier stage for amplifying the output pulse generated by the monostable circuit (36).

10. A recording device according to claim 4 with said channel width selector (24) comprising a width program in the form of a predetermined number of channel-width-selecting voltage inputs (U1-U16), said time-division signal multiplex circuit arrangement (17, 18, 19) having a number of individual signal inputs (1a-16c) substantially greater than said predetermined number of channel-width-selecting voltage inputs (U1-U16), and means whereby said channel width selector (24) and said time-division signal multiplex circuit arrangement (17, 18, 19) are controllable such that a desired number of measurement signals are allocatable selectively to a single recording channel and to respective different recording channels.

11. A recording device according to claim 10, with said time-division signal multiplex circuit (17, 18, 19) having a number of individual signal inputs equal to at least three times said predetermined number of channel width selecting voltage inputs (U1-U16).

12. A recording device according to claim 10, with said last-mentioned means providing for recording of at least sixteen measurement signals on each of at least three recording channels.

13. A recording device according to claim 11, with said channel width selector (24) having at least sixteen channel-width-selecting voltage inputs for individually determining the widths of sixteen different recording channels on said recording carrier (4).

14. A recording device according to claim 13, with said time-division signal multiplex circuit (17, 18, 19, etc.) having at least a number of signal multiplex units equal to the number of recording channels, and each signal multiplex unit having at least sixteen individual signal inputs for sequential sampling during scanning of the width of a respective associated recording channel by said recording head (3).

* * * * *